United States Patent [19]

Eryurek et al.

[11] Patent Number: 5,746,511
[45] Date of Patent: May 5, 1998

[54] TEMPERATURE TRANSMITTER WITH ON-LINE CALIBRATION USING JOHNSON NOISE

[75] Inventors: Evren Eryurek; Gary Lenz, both of Eden Prairie, Minn.

[73] Assignee: Rosemount Inc., Eden Prairie, Minn.

[21] Appl. No.: 582,514

[22] Filed: Jan. 3, 1996

[51] Int. Cl.[6] .................................................. G01K 15/00
[52] U.S. Cl. ................................................................ 374/2
[58] Field of Search .............................. 73/118.1, 116, 73/168, 659; 364/550, 551, 552, 553, 551.01, 140, 571.07; 395/11, 23, 27, 22; 374/120, 2, 175

[56] References Cited

U.S. PATENT DOCUMENTS

| | | | |
|---|---|---|---|
| 4,337,516 | 6/1982 | Murphy et al. | 364/551 |
| 4,517,468 | 5/1985 | Kemper et al. | 290/52 |
| 4,635,214 | 1/1987 | Kasai et al. | 364/551 |
| 4,707,796 | 11/1987 | Calabro et al. | 364/552 |
| 4,777,585 | 10/1988 | Kokawa et al. | 364/164 |
| 4,831,564 | 5/1989 | Suga | 364/551.01 |
| 4,873,655 | 10/1989 | Kondraske | 364/553 |
| 4,907,167 | 3/1990 | Skeirik | 364/500 |
| 4,992,965 | 2/1991 | Hölter et al. | 364/551.01 |
| 5,005,142 | 4/1991 | Lipchak et al. | 364/550 |
| 5,043,862 | 8/1991 | Takahashi et al. | 364/162 |
| 5,098,197 | 3/1992 | Shepard et al. | 374/120 |
| 5,111,531 | 5/1992 | Grayson et al. | 395/23 |
| 5,121,467 | 6/1992 | Skeirik | 395/11 |
| 5,122,976 | 6/1992 | Bellows et al. | 364/550 |
| 5,142,612 | 8/1992 | Skeirik | 395/11 |
| 5,148,378 | 9/1992 | Shibayama et al. | 364/571.07 |
| 5,167,009 | 11/1992 | Skeirik | 395/27 |
| 5,175,678 | 12/1992 | Frerichs et al. | 364/148 |
| 5,197,114 | 3/1993 | Skeirik | 395/22 |
| 5,197,328 | 3/1993 | Fitzgerald | 73/168 |

(List continued on next page.)

FOREIGN PATENT DOCUMENTS

| | | |
|---|---|---|
| 64-1914 | 1/1989 | Japan. |
| 64-72699 | 3/1989 | Japan. |
| 5-122768 | 5/1993 | Japan. |
| 6-19729 | 3/1994 | Japan. |
| 7-63586 | 3/1995 | Japan. |

OTHER PUBLICATIONS

"Automated Generation of Nonlinear System Characterization for Sensor Failure Detection," *ISA*, by B.R. Upadhyaya et al., 1989 pp. 269–274 (no month).

"Development of a Long–Life, High–Reliability Remotely Operated Johnson Noise Thermometer," *ISA* by R.L. Shepard et al., 1991, pp. 77–84 (no month).

"Development and Application of Neural Network Algorithms For Process Diagnostics," *Proceedings of the 29th Conference on Decision and Control*, by B.R. Upadhyaya et al., 1990, pp. 3277–3282 (no month).

"Fuzzy Logic and Artificial Neural Networks for Nuclear Power Plant Applications," *Proceedings of the American Power Conference*, R.C. Berkan et al (no date).

(List continued on next page.)

*Primary Examiner*—Richard Chilcot
*Assistant Examiner*—William L. Oen
*Attorney, Agent, or Firm*—Westman, Champlin & Kelly, P.A.

[57] ABSTRACT

A temperature transmitter and a process control system includes a sensor input for coupling to a temperature sensor having a temperature dependent resistance. The resistance measuring circuitry couples to the sensor input and provides a resistance output related to resistance of the temperature dependent resistance. Analog to digital conversion circuitry couples to the sensor input and provides a digital output related to AC signals across the sensor input. Digital signal processing circuitry isolates a Johnson noise component of the AC signals and provides a digitized Johnson noise output. Temperature measurement circuitry provides a calibrated temperature output based upon the resistance output and the digitized Johnson noise output. Output circuitry transmits the calibrated temperature output over the process control loop.

17 Claims, 3 Drawing Sheets

U.S. PATENT DOCUMENTS

| | | | |
|---|---|---|---|
| 5,212,765 | 5/1993 | Skeirik | 395/11 |
| 5,214,582 | 5/1993 | Gray | 364/424.03 |
| 5,224,203 | 6/1993 | Skeirik | 395/22 |
| 5,228,780 | 7/1993 | Shepard et al. | 374/175 |
| 5,235,527 | 8/1993 | Ogawa et al. | 364/571.05 |
| 5,274,572 | 12/1993 | O'Neill et al. | 364/550 |
| 5,282,131 | 1/1994 | Rudd et al. | 364/164 |
| 5,282,261 | 1/1994 | Skeirik | 395/22 |
| 5,303,181 | 4/1994 | Stockton | 365/96 |
| 5,305,230 | 4/1994 | Matsumoto et al. | 364/495 |
| 5,311,421 | 5/1994 | Nomura et al. | 364/157 |
| 5,317,520 | 5/1994 | Castle | 364/482 |
| 5,327,357 | 7/1994 | Feinstein et al. | 364/502 |
| 5,333,240 | 7/1994 | Matsumoto et al. | 395/23 |
| 5,349,541 | 9/1994 | Alexandro, Jr. et al. | 364/578 |
| 5,357,449 | 10/1994 | Oh | 364/551.01 |
| 5,361,628 | 11/1994 | Marko et al. | 73/116 |
| 5,365,423 | 11/1994 | Chand | 364/140 |
| 5,367,612 | 11/1994 | Bozich et al. | 395/22 |
| 5,384,699 | 1/1995 | Levy et al. | 364/413.13 |
| 5,394,341 | 2/1995 | Kepner | 364/551.01 |
| 5,404,064 | 4/1995 | Mermelstein et al. | 310/319 |
| 5,408,406 | 4/1995 | Mathur et al. | 364/163 |
| 5,408,586 | 4/1995 | Skeirik | 395/23 |
| 5,414,645 | 5/1995 | Hirano | 364/551.01 |
| 5,419,197 | 5/1995 | Ogi et al. | 73/659 |
| 5,430,642 | 7/1995 | Nakajima et al. | 364/148 |
| 5,469,735 | 11/1995 | Watanabe | 73/118.1 |

OTHER PUBLICATIONS

"Software-Based Fault-Tolerant Control Design for Improved Power Plant Operation," *IEEE/IFAC Joint Symposium on Computer–Aided Control System Design*, Mar. 7–9, 1994 pp. 585–590.

"In Situ Calibration of Nuclear Plant Platinum Resistance Thermometers Using Johnson Noise Methods," *EPRI* Jun. 1983.

"Integration of Multiple Signal Validation Modules for Sensor Monitoring," *Department of Nuclear Engineering*, by B. Upadhyaya et al. Jul. 8, 1990 pp. 1–6.

"Johnson Noise Power Thermometer and its Application in Process Temperature Measurement," *American Institute of Physics* by T.V. Blalock et al., 1982, pp. 1249–1259 (no month).

"Johnson Noise Thermometer for High Radiation and High–Temperature Environments," *Fifth Symposium*, by L. Oakes et al., Jan. 1988, pp. 2–23.

"Neural Networks for Sensor Validation and Plant Monitoring," *International Fast Reactor Safety Meeting*, by B. Upadhyaya, Aug. 12–16, 1990, pp. 2–10.

"Neural Networks for Sensor Validation and Plantwide Monitoring," by E. Eryurek.

"Noise Thermometry for Industrial and Metrological Application at KFA Julich," *7th International Symposium on Temperature*, by H. Brixy et al. 1992 (no month).

"Application of Neural Networks for Sensor Validation and Plant Monitoring," *Nuclear Technology*, by B. Upadhyaya, vol. 97, No. 2, Feb. 1992 pp. 170–176.

Parallel, Fault–Tolerant Control and Diagnostics System for Feedwater Regulation in PWRS, *Proceedings of the American Power Conference*, by E. Eryurek et al. (no date).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Survey, Applications, And Prospects of Johnson Noise Thermometry," *Electrical Engineering Department*, by T. Blalock et al. 1981 pp. 2–11 (no month).

"Tuned–Circuit Dual–Mode Johnson Noise Thermometers," by R.L. Shepard, 1992 (no month).

"Tuned–Circuit Johnson Noise Thermometry," *7th Symposium on Space Nuclear Power Systems*, by Michael Roberts et al., Jan. 1990.

"Using Artificial Neural Networks to Identify Nuclear Power Plant States," by Israel E. Alguindigue et al., pp. 1–4 (no date).

"Wavelet Analysis of Vibration, Part I: Theory[1]," *Journal of Vibration and Acoustics*, by D.E. Newland, vol. 116, Oct. 1994, pp. 409–416.

"Wavelet Analysis of Vibration, Part 2: Wavelet Maps," *Journal of Vibration and Acoustics*, by D.E. Newland, vol. 116, Oct. 1994, pp. 417–425.

"Development of a Resistance Thermometer For Use Up to 1600°C,", by M.J. de Groot and J.F. Dubbeldam, *Cal Lab*, Jul./Aug. 1996, pp. 38–41.

"Smart Field Devices Provide New Process Data, Increase System Flexibility," *I&CS*, by Mark Boland, Nov. 1994, pp. 45–51.

"A Decade of Progress in High Temperature Johnson Noise Thermometry," *American Institute of Physics*, by T.V. Blalock and R.L. Shepard, 1982 pp. 1219–1223 (no month).

"An Integrated Architecture For Signal Validation in Power Plants," *Third IEEE International Symposium on Intelligent Control*, Aug. 24–26, 1988, pp. 1–6.

"Application of Neural Computing Paradigms for Signal Validation," *Department of Nuclear Engineering*, by B.R. Upadhyaya, E. Eryurek and G. Mathai, pp. 1–18 (no date).

"Application of Johnson Noise Thermometry to Space Nuclear Reactors," *Presented at the 6th Symposium on Space Nuclear Power Systems*, by M.J. Roberts, T.V. Blalock and R.L. Shepard, Jan. 9–12, 1989.

TEMPERATURE TRANSMITTER WITH ON-LINE CALIBRATION USING JOHNSON NOISE

BACKGROUND OF THE INVENTION

The present invention relates to transmitters of the type used to measure temperature of a process. More specifically, the present invention relates to a temperature transmitter having on-line calibration capabilities.

Temperature transmitters are used in the process control industry to sense the temperature of a process fluid, for example. Typically, the temperature transmitter is located in a remote location and coupled to a control room over a 4–20 mA current loop. A temperature sensor is placed in the process fluid and provides an output related to temperature of the process fluid. The temperature sensor, for example, may be an RTD which is a device having a temperature dependent resistance. The transmitter injects a current into the RTD and the resultant voltage drop across the RTD is used to measure resistance. The voltage is converted into a digital format using an analog to digital converter and provided to a microprocessor. The microprocessor converts the measured voltage into a digital value representative of temperature. The microprocessor may perform additional calibration or compensation on the digital voltage based upon the particular type of RTD sensor being used or periodic calibrations performed by an operator. The digital temperature value is transmitted on the 4–20 mA current loop for receipt by control circuitry in the control room. Transmission over the 4–20 mA current loop may be by controlling the analog current level to represent the sensed temperature or through digitally modulating information onto the loop.

The relationship between resistance of a RTD and temperature tends to change over time. These changes can be periodically calibrated out of the system to maintain accuracy of the temperature measurement. For example, periodically an operator may be required to journey into the field to calibrate the transmitter. The transmitter is calibrated by placing the RTD sensor in a bath of a known temperature and monitoring output from the temperature transmitter. The difference between the actual temperature of the temperature bath and the output temperature is used as a calibration factor and stored in memory for subsequent use by the microprocessor.

Another technique for calibrating a temperature measuring device is described in U.S. Pat. No. 5,228,780 which issued Jul. 20, 1993 to Shepard et al. entitled DUAL-MODE SELF-VALIDATING RESISTANCE/JOHNSON NOISE THERMOMETER SYSTEM. This patent describes a technique of measuring Johnson noise to calibrate an RTD sensor. Johnson noise describes the AC noise signal which is generated in a resistance element and is directly related to temperature of the element. Johnson noise is the result of conduction electrons in an atomic lattice being randomly agitated by thermal noise displacements of the atoms. This produces a small, wide-band AC voltage or current. In order to accurately measure Johnson noise, the noise signal must be integrated over a relatively long period of time. This integration period makes Johnson noise impractical for frequent, continual monitoring of a process temperature. The Shepard et al. reference is not directed to use with a process control transmitter. Further, the Shepard reference uses noise rejection circuitry which is very delicate and highly susceptible to noise from sources other than the Johnson noise.

Therefore, it can be seen that the art lacks a temperature transmitter that is capable of accurate, on-line self-calibration.

SUMMARY OF THE INVENTION

A temperature transmitter for use in a process control system includes a sensor input for coupling to a temperature sensor. The temperature sensor has a resistance related to temperature of the temperature sensor. Resistance measuring circuitry coupled to the sensor input provides a resistance output related to resistance of the temperature sensor. Measurement circuitry coupled to the resistance measurement circuitry responsively provides a temperature output related to temperature of the temperature sensor. An analog to digital conversion circuit couples to the sensor input and provides a digital output representative of AC noise in the temperature sensor. Digital signal processing circuitry isolates a Johnson noise component in the AC noise and provides a digitized Johnson noise output. Temperature measurement circuitry provides a calibrated temperature output based upon the resistance output and the digitized Johnson noise output. Output circuitry transmits the calibrated temperature over the process control loop. In one embodiment, the temperature transmitter is powered with power from the process control loop.

DETAILED DESCRIPTION OF THE PREFERRED EMBODIMENTS

Figure 1:
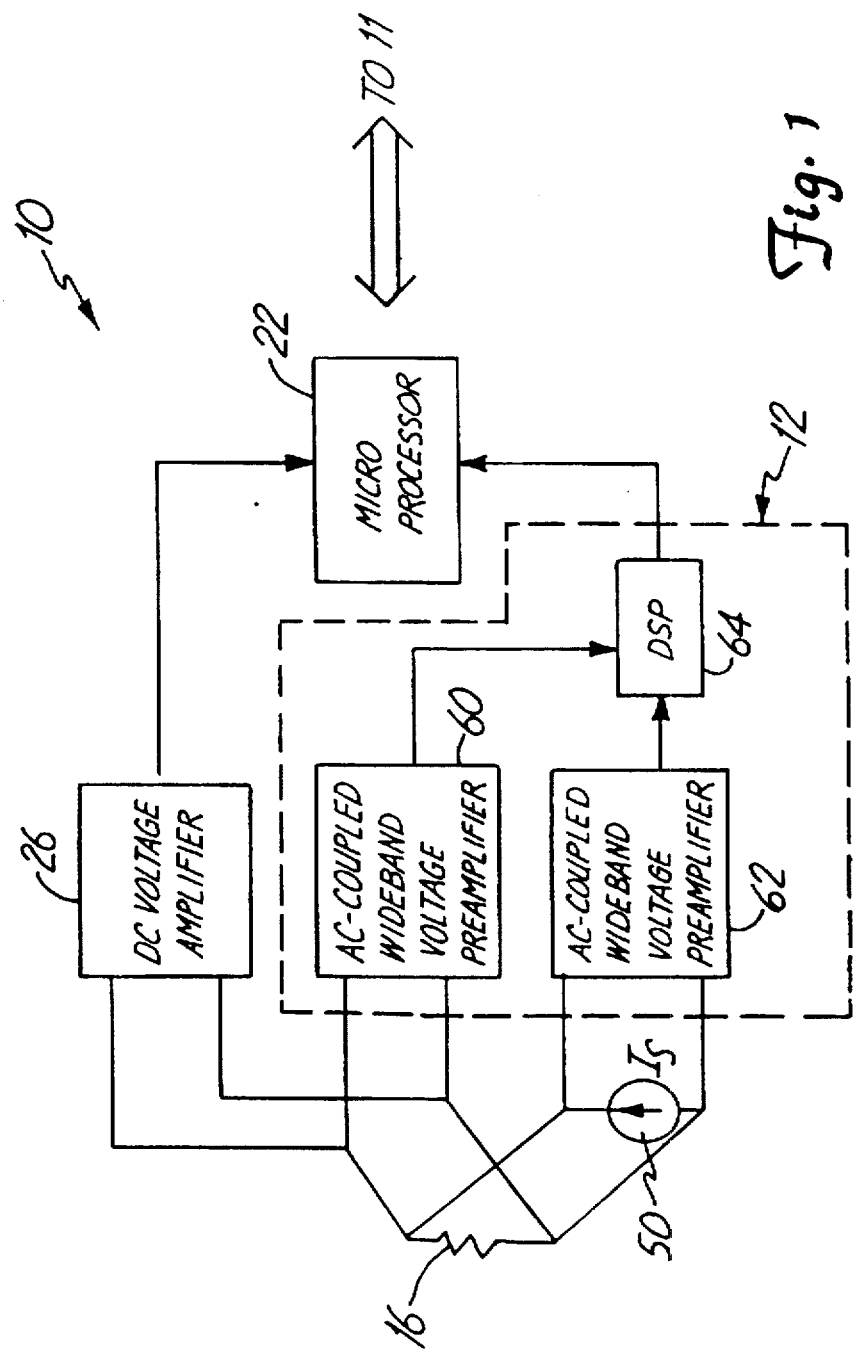
FIG. 1 is a simplified block diagram showing a temperature transmitter in accordance with the present invention.

FIG. 1 is a simplified block diagram of transmitter 10 coupled to control loop 11 including Johnson noise measurement circuitry 12 in accordance with the present invention. Transmitter 10 is coupled to RTD (resistive temperature device) 16 driven by current source 50 providing a current $I_S$. DC voltage amplifier 26 is connected across RTD temperature sensor 16 and provides an output related to voltage drop across RTD 16, and hence temperature, to microprocessor 22. Microprocessor 22 converts this voltage into a value representative of temperature of RTD 16 for transmission over process control loop 11.

Johnson noise measurement circuitry 12 includes AC coupled wide band voltage preamplifiers 60 and 62 which amplify AC voltage signals generated across RTD 16 and provide outputs to digital signal processing circuitry 64. DSP circuitry 64 monitors the cross power spectral density (CPSD) of the two noise signals and identifies the Johnson noise component of the noise in accordance with the invention. The Johnson noise signal is provided to microprocessor 22 and is a very accurate temperature reference signal which is used by microprocessor 22 to calibrate temperature measurements made using DC voltage amplifier 26.

Figure 2:
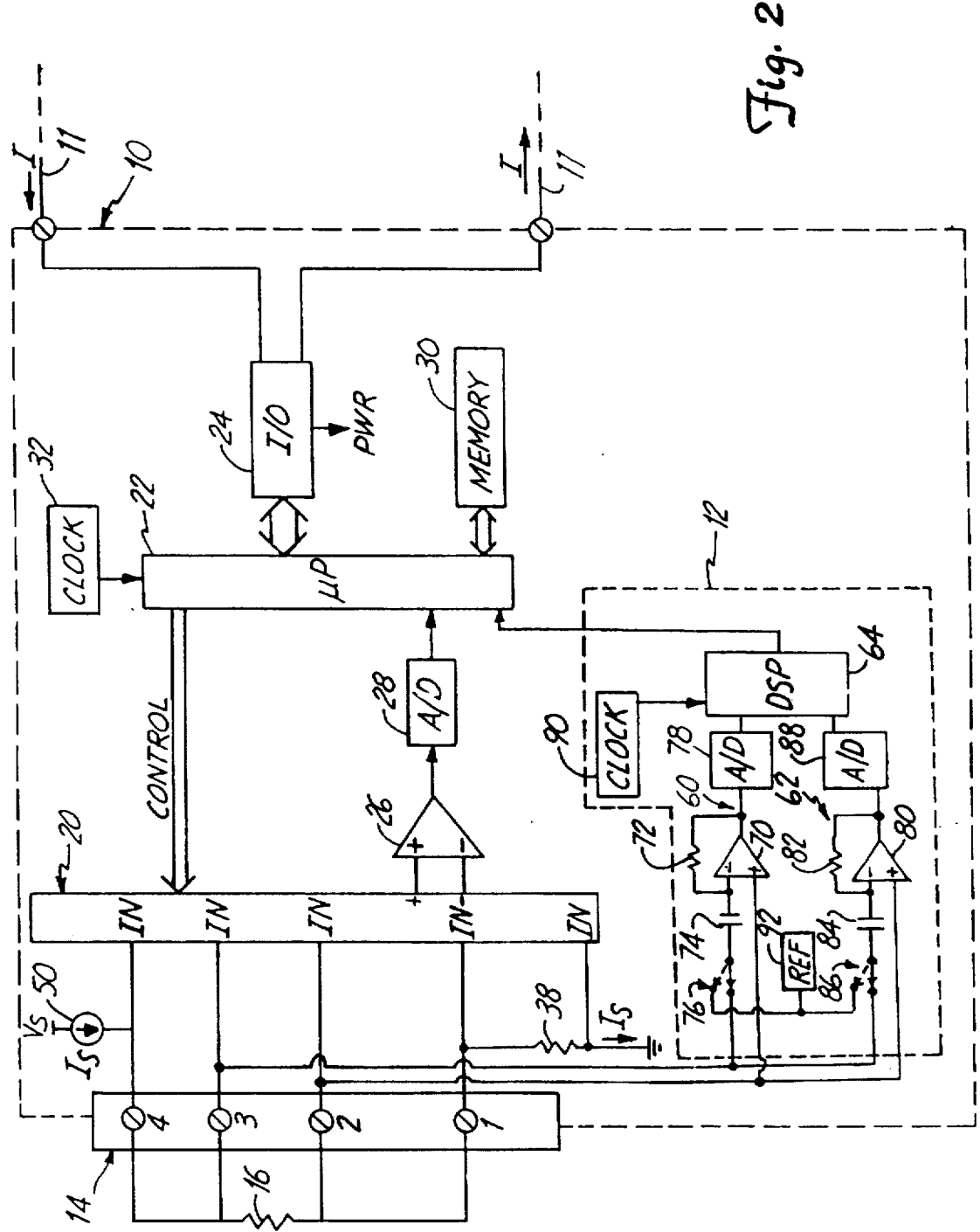
FIG. 2 is a more detailed block diagram of the temperature transmitter of FIG. 1.

FIG. 2 is a more detailed block diagram of temperature transmitter 10 shown in FIG. 1 connected to measure temperature with RTD sensor 16. Temperature transmitter 10 includes Johnson noise measurement circuitry 12, in accordance with the invention. Transmitter 10 couples to process control loop 11 which provides power to transmitter 10 and over which information is transmitted and received. Transmitter 10 includes terminal block 14 having terminals 1 through 4 for coupling to, for example, an RTD temperature sensor 16. FIG. 2 shows the electrical connections to RTD 16. Sensor 16 can be either internal or external to transmitter 10. Transmitter 10 includes multiplexer 20 controlled by microprocessor 22 which is coupled to control loop 11 through input/output (I/O) circuitry 24. Multiplexer 20 multiplexes appropriate sets of analog signals, including signals from terminals 1 through 4, to positive and negative inputs of differential amplifier 26, which connects to high accuracy A/D converter 28. In one embodiment, converter 28 has an accuracy of 17 bits and a conversion rate of 14 samples/second. Memory 30 stores instructions and information for microprocessor 22, which operates at a speed determined by clock 32. Multiplexer 20 selectively connects input pairs to the positive and negative inputs of differential amplifier 26. A reference resistance $R_{REF}$ 38 couples to multiplexer 20 and is connected in series with RTD 16.

In operation, transmitter 10 measures temperature of sensor 16 and transmits a representation of temperature over control loop 11. Transmitter 10 employs the following equation to compute the major value of temperature of RTD 16:

$$R_{INPUT} = \frac{V_{RINPUT}}{V_{RREF}} (R_{REFNOM}) \qquad \text{Equation 1}$$

where:

$R_{REFNOM}$=the nominal resistance of the reference resistance in ohms, and/or stored in memory 30;

$V_{RINPUT}$=voltage drop across the input; and $V_{RREF}$=voltage drop across $R_{REF}$.

Current source 50 provides current $I_S$ through sensor 16 (via terminals 1 and 4) and reference resistor 38. Microprocessor 22 measures the voltage drop ($V_{RINPUT}$) across RTD 16 between terminals 2 and 3, and the voltage drop ($V_{RREF}$) across resistor 38 with MUX 20. $R_{REFNOM}$ is a calculation constant and is retrieved from memory 30. In a four-wire resistance measurement such as this, the voltage drop across the connections to terminals 2 and 3 is largely eliminated, since substantially all the current flows between terminals 1 and 4, and has little impact on the accuracy of the measurement. $R_{INPUT}$ is converted to temperature units with a look-up table or suitable equation stored in memory 30.

Johnson noise measurement circuitry 12 is shown in greater detail in FIG. 2. AC coupled wide band voltage pre-amplifier 60 includes differential amplifier 70 with negative feedback through resistor 72. The non-inverting input of amplifier 70 connects to terminal 2 of terminal block 14. The inverting input of amplifier 70 connects to terminal 3 of block 13 through AC isolating capacitor 74 and switch 76. The output of amplifier 70 connects to digital signal processing circuitry 64. Similarly, amplifier 62 includes differential amplifier 80 having negative feedback through resistor 82. The non-inverting input to amplifier 80 connects to terminal 2 of terminal block 14 and the inverting input connects to terminal 3 of terminal block 14 through AC isolation capacitor 84 and switch 86. The output from differential amplifier 80 is provided to digital signal processing circuitry 64. Amplifiers 60 and 62 are connected in parallel. In a preferred embodiment, amplifiers 60 and 62 comprise operational amplifiers.

Digital signal processing circuitry 64 connects to clock 90 which may, for example, operate at a different frequency than clock 32 and may be derived from the clock signal generated by clock 32. In the embodiment shown in FIG. 2, an AC reference signal is generated by reference 92 and the inverting inputs of differential amplifiers 70 and 80 may be selectively coupled to reference 92 through switches 76 and 86, respectively. The output from amplifier 70 is provided in a digital format to DSP circuitry 64 by analog to digital converter 78. Similarly, the output from amplifier 80 is provided in a digital format to DSP circuitry by analog to digital converter 88. In one embodiment, analog to digital converters 78 and 88 sample the amplified AC noise signals provided by amplifiers 70 and 80 at a sampling rate of 200 kHz or more.

One aspect of the invention includes the use of digital signal processing circuitry to obtain and identify the Johnson noise signal generated in RTD 16. This Johnson noise signal tends to have a relatively small amplitude and is difficult to identify and separate from other noise which may be provided to the inputs of amplifiers 60 and 62.

Digital signal processing circuitry 64 performs a spectral analysis on the noise signals received from amplifiers 60 and 62. Digital signal processing circuitry 64 operates in accordance with well known signal processing techniques. For example, input signals are operated on as discrete values in the time and/or frequency domains. One type of signal processing algorithm is the z transform which allows circuitry 64 to operate in the z domain. In one embodiment, the spectral analysis is performed using a Fast Fourier Transform (FFT). A Fast Fourier Transform is a known technique for performing a spectral analysis which identifies frequency components in an AC signal. In another embodiment, a spectral analysis is performed using wavelet analysis. Wavelet theory is described in *Wavelet Analysis of Vibration, Part I: Theory*, D.E. Newland, JOURNAL OF VIBRATION AND ACOUSTICS, October 1994, Vol. 116, pg. 409. A specific application of wavelet analysis and explanation of a Discreet Wavelet Transform (DWT) is set forth in *Wavelet Analysis of Vibration, Part 2: Wavelet Maps*, D.E. Newland, JOURNAL OF VIBRATION AND ACOUSTICS, October 1994, Vol. 116, pg. 417. In one embodiment, wavelet analysis is preferred to Fast Fourier Analysis because wavelet analysis provides a more efficient method and consumes less computational time when identifying spectral components in a known frequency range.

One aspect of the present invention includes using two separate analog noise signals generated by amplifiers 60 and 62. Using these two signals, digital signal processing circuitry 64 calculates the Cross Powered Spectral Density (CPSD) and reduces the affects of uncorrelated noise on the Johnson noise measurement. For example, assuming that the incoming signals are processed using data blocks having 1024 samples and the sampling rate is 200 kHz, the highest possible gross bandwidth of the system is 100 kHz. Due to the non-ideal nature of the various components, such as the anti-aliasing filters, the actual gross bandwidth will probably be closer to 50 kHz. The frequency resolution will be about 200 Hz. The spectrum of the cross power spectral density will be broken into 1024 data points, each of which represents about 200 Hz of bandwidth. Since the spectrum is "folded" and includes negative frequencies, the cross power spectral density will actually contain about 512 unique data points at 200 Hz resolution. The anti-aliasing filter will effectively cut this in half. The final cross power spectral density bandwidth is therefore about 50 kHz of about 256 data points with a resolution of 200 Hz. It should be understood that other combinations of block size, sampling rate, and number of blocks processed can be used and may give better results for the specific implementation and environment.

Figure 3:
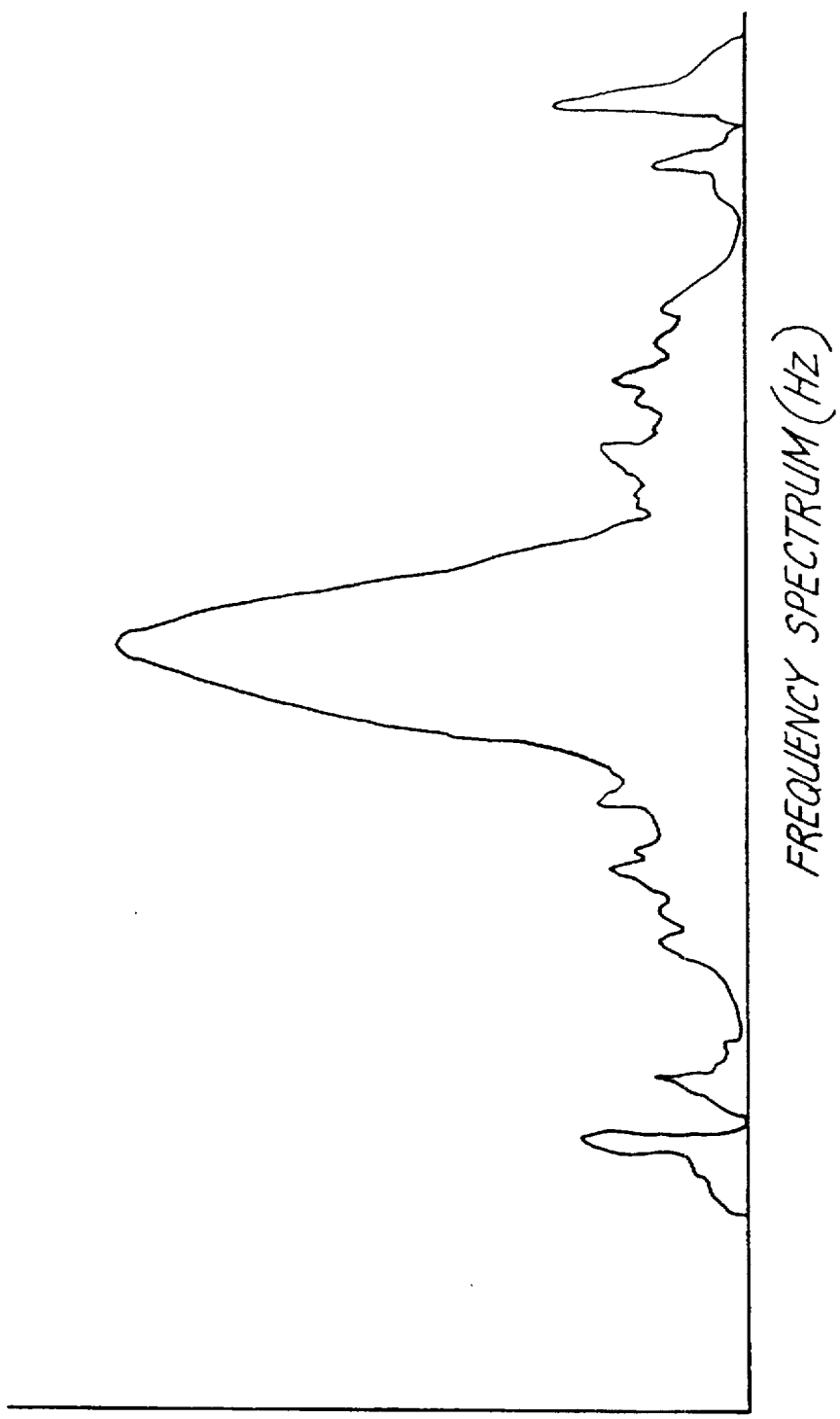
FIG. 3 is a graph of power spectral density versus frequency of the AC noise signal generated in a RTD temperature sensor.

FIG. 3 is an example power spectral density versus frequency spectrum as output by amplifier 60 or 62. Narrow band interference such as electromagnetic interference, microphonics, etc. will cause a departure in the flat region of the spectrum and will be ignored by digital signal processing circuitry 64. This will reduce the gross bandwidth to a smaller net bandwidth. The smaller net bandwidth is used in the cross power spectral density measurement. The peak in the cross power spectral density measurement is indicative of Johnson noise in RTD sensor 16. Thermal noise signals which arise in the system, such as noise generated in the wiring or in the AC coupled amplifiers 60 and 62, will tend to be reduced to zero in the cross power spectral density measurement because they are uncorrelated. The effects of uncorrelated noise are reduced by longer averaging times for the cross power spectral density calculation. The only correlated noise which appears in the cross power spectral density measurement is that of the sensor itself, from the DC current source 50 and any electromagnetic interference microphonics. Therefore, improvement in the operation of the invention may be achieved by reducing any noise generated by current source 50.

For accurate computation of the cross power spectral density, the gains of amplifiers 60 and 62 must be known. Determination of these gains is accomplished by connecting the inverting inputs of amplifiers 60 and 62 to an AC reference signal source 92 by appropriate positioning of switches 76 and 86, respectively. With switches 76 and 86 connecting amplifiers 70 and 80 to reference 92, the gain of amplifiers 60 and 62 can be determined if the value of reference 92 is accurately known.

In operation, microprocessor 22 periodically determines the temperature of RTD 16 by using the Johnson noise in accordance with the following equation:

$$T = \frac{KV_N}{C} \qquad \text{Equation 2}$$

where:

T=temperature of the sensor;

K=Boltzman constant;

C=a fixed capacitance; and $V_N$=Johnson noise.

Microprocessor 22 calculates the difference between the temperature of RTD sensor 16 measured using circuitry 12 and the value calculated using the look up table and the $R_{INPUT}$ value calculated with Equation 1 as discussed above. This difference is used to calibrate temperature measurements. The difference between the two temperature measurements is stored or "logged" in memory 30 by microprocessor 22 and used to update future temperature measurements of temperature made by measuring the voltage drop across RTD sensor 16 using amplifier 26. For example, $R_{REFNOM}$ of Equation 1 can be adjusted in response to calculated difference to compensated for inaccuracies and drift in the sensor 16. In one embodiment, microprocessor 22 stores a number of temperature differences taken over time with RTD sensor 16 at different temperatures to develop a more comprehensive and more accurate characterization curve of RTD sensor 16. The additional data points provide improved accuracy in the compensation and calibration.

Although the present invention has been described with reference to the preferred embodiments, workers skilled in the art will recognize that changes may be made in form and detail without departing from the spirit and scope of the invention. For example, other types of digital signal processing techniques may be employed. Further, in some embodiments it may be desirable to implement the digital signal processing using analog circuits.

What is claimed is:

1. A transmitter in a process control system, comprising:

a sensor input for coupling to a temperature sensor having a temperature dependant resistance;

resistance measuring circuitry coupled to the sensor input having resistance output related to resistance of the temperature dependent resistance;

an amplifier coupled to the sensor input providing an amplified output having an AC noise component and a Johnson noise component;

analog to digital conversion circuitry coupled to the amplified output providing a digital output;

digital signal processing circuitry coupled to the digital output for isolating the Johnson noise component and providing a digitized Johnson noise output;

temperature measurement circuitry coupled to the resistance measurement circuitry and the digital signal processing circuitry providing a calibrated temperature output based upon the resistance output and the digitized Johnson noise output; and output circuitry for coupling to a process control loop and transmitting the calibrated temperature output over the loop.

2. The transmitter of claim 2 including:

a second wideband AC-coupled amplifier coupled to the sensor input providing an amplified output having an AC noise component and a Johnson noise component; and second analog to digital conversion circuitry coupled to the amplified output of the second amplifier and providing a digital output to the digital signal processing circuitry.

3. The transmitter of claim 2 wherein the digital signal processing circuitry calculates Cross Power Spectral Density based upon the digitized outputs.

4. The transmitter of claim 1 wherein the digital signal processing circuitry performs a Fast Fourier Transform on the digital output.

5. The transmitter of claim 1 wherein the digital signal processing circuitry performs a wavelet transform on the digital output.

6. The transmitter of claim 1 including a power source coupled to the process control loop for generating power for the transmitter.

7. The transmitter of claim 1 wherein the amplifier comprises a wideband AC-coupled amplifier.

8. The transmitter of claim 1 including a memory coupled to the temperature measurement circuitry storing a calibration value related to a comparison of the resistance output and the digitized Johnson noise output.

9. The transmitter of claim 1 wherein the output circuitry transmits a signal related to the digitized Johnson noise output.

10. The transmitter of claim 9 wherein the signal is a digital signal.

11. The transmitter of claim 1 wherein the output circuitry transmits a signal by controlling current through the control loop.

12. The transmitter of claim 1 wherein the output circuitry digitally transmits a signal on the control loop.

13. The transmitter of claim 1 including a reference for calibrating the Johnson noise output.

14. The transmitter of claim 12 including a switch for selectively coupling the reference to the amplifier.

15. The transmitter of claim 1 including a capacitor connected in series between the amplifier and the sensor input.

16. The transmitter of claim 1 wherein the resistance measuring circuitry comprises:
   a current source connected in series with the sensor input;
   a differential amplifier for connection across the sensor input and providing a difference output; and
   conversion circuitry coupled to the differential amplifier providing a digitized difference output related to resistance of the sensor.

17. The transmitter of claim 16 including a multiplexer for coupling the sensor input to the differential amplifier.

* * * * *

UNITED STATES PATENT AND TRADEMARK OFFICE
CERTIFICATE OF CORRECTION

PATENT NO. : 5,746,511
DATED : May 5, 1998
INVENTOR(S) : Evren Eryurek et al.

It is certified that error appears in the above-indentified patent and that said Letters Patent is hereby corrected as shown below:

Title page,

Under [56] References Cited

U.S. PATENT DOCUMENTS

Insert --
4,099,413   7/1978      Ohte et al.........73/359R
--

Under OTHER PUBLICATIONS

Insert --
"Measurement Techniques," by A. B. Kisilevskii et al., Vol. 25, No. 3, March 1982, New York, USA, pgs. 244-246.

"Measurement of the Temperature Fluctuation in a Resistor Generating 1/F Fluctuation," by S. Hashiguchi, <u>Japanese Journal of Applied Physics</u>, Vol. 22, No. 5, Part 2, May 1983, pgs. L284-L286.

UNITED STATES PATENT AND TRADEMARK OFFICE
CERTIFICATE OF CORRECTION

PATENT NO. : 5,746,511
DATED : May 5, 1998
INVENTOR(S) : Evren Eryurek et al.

It is certified that error appears in the above-indentified patent and that said Letters Patent is hereby corrected as shown below:

"A New Method of Johnson Noise Thermometry*," by C.J. Borkowski et al., <u>Review of Scientific Instruments</u>, Vol. 45, No. 2, February 1974, pgs. 151-162.

"Detection of Hot Spots in Thin Metal Films Using an Ultra Sensitive Dual Channel Noise Measurement System," by G.H. Massiha et al., <u>Energy and Information Technologies in the Southeast, Columbia</u>, Vol. 3 of 3, April 1989, pgs. 1310-1314. --

Col. 6, line 66, delete "12" and insert --13--.

Signed and Sealed this

Sixth Day of April, 1999

Attest:

Q. TODD DICKINSON

Attesting Officer

Acting Commissioner of Patents and Trademarks